United States Patent [19]

Kobayashi

[11] Patent Number: 4,525,761

[45] Date of Patent: Jun. 25, 1985

[54] TRANSCRIBER WITH ERASING DEVICE

[75] Inventor: Minoru Kobayashi, Hachioji, Japan

[73] Assignee: Olympus Optical Company Limited, Tokyo, Japan

[21] Appl. No.: 600,607

[22] Filed: Apr. 17, 1984

Related U.S. Application Data

[63] Continuation of Ser. No. 316,515, Oct. 29, 1981, abandoned, which is a continuation of Ser. No. 154,490, May 29, 1980, abandoned.

[30] Foreign Application Priority Data

May 30, 1979 [JP] Japan .................................. 54-72658

[51] Int. Cl.³ .............................................. G11B 5/12
[52] U.S. Cl. .................................... 360/137; 360/118
[58] Field of Search ............... 360/118, 88, 90, 92–93, 360/137

[56] References Cited

U.S. PATENT DOCUMENTS 3,024,320 3/1962 Nye ...................................... 360/118
3,612,774 10/1971 Wiklund .......................... 360/118 X

FOREIGN PATENT DOCUMENTS 1952223 4/1970 Fed. Rep. of Germany ...... 360/118
870846 6/1961 United Kingdom ................ 360/118
1593421 7/1981 United Kingdom ................ 360/118

OTHER PUBLICATIONS

IBM/TDB, vol. 17, No. 5, Oct. 1974, p. 1262, "Bulk Eraser" by Faircloth et al.

Primary Examiner—John H. Wolff
Attorney, Agent, or Firm—Toren, McGeady, Stanger

[57] ABSTRACT

A transcriber used for repeatedly reproducing information recorded on a tape, comprised of a through-hole provided in a part of the main body of the transcriber and an eraser which has a magnet to generate magnetic flux in a prescribed direction to the through-hole.

6 Claims, 3 Drawing Figures

TRANSCRIBER WITH ERASING DEVICE

This is a continuation of application Ser. No. 316,515, filed Oct. 29, 1981, now abandoned which was a continuation of application Ser. No. 154,490, filed May 29, 1980, now abandoned.

BACKGROUND OF THE INVENTION

1. Field of the Invention

The present invention is relevant to transcribers and is particularly pertinent to those transcribers which can erase information recorded on a tape easily and instantaneously.

2. Description of Prior Art

FIG. 1 denotes a transcriber generally used by typists for reproduction purpose. In FIG. 1, "1" is the main body of the transcriber and almost at the center front of the main body, cassette chamber "2" is provided, and both the power switch "3" and the pilot lamp "4" which is lighted by throwing-in the power switch "3" are provided next the cassette chamber "2". Above the cassette chamber "2", the plug-in-hole "5" for a speaker is provided and beneath the chamber "2", the various operating buttons "6" are provided. These buttons "6" include a fast forwarding button "6a", a reproducing button "6b", a rewinding button "6c", an eraser button "6d" and a stop button "6e". Next to those operating buttons "6", the dials for tone "7" and for volume "8" are provided and between those dials and the cassette chamber "2", the ejector button "9" is provided. To the side of the main body "1", the dial "10" to adjust tape speed and the jack "11" for remote controlling are attached. By connecting a foot operating switch which is not denoted in the figure, to this jack "11", the reproducing operation can also be controlled by a foot.

In this type of transcriber, the mechanism is so arranged that a tape with information recorded is first mounted in the cassette chamber "2", and the information can be reproduced for typing purposes by operating the reproducing button "6b" which puts the equipment in reproduction state, and at the same time operating the fast forwarding button "6a" or the rewinding button "6c" as required so as to repeat the reproduction.

It is sometimes very important in transcribers to completely the used information on a tape in order to keep information confidential.

Therefore, in this type of transcriber explained above, the mechanism is so arranged that information on a tape can be erased in a full width by operating both the rewinding button "6c" and the eraser button "6d" at the same time, thus in conjunction with the rewinding and erasing functions.

However, this type of transcriber, which combines rewinding and erasing for erasing, always requires rewinding the tape to erase, and thus it has had the drawback of low typing efficiency.

Recently there have been transcribers that can also do recording, but again this type requires much more time to erase recorded information because erasing in half widths can be done only when recording, as in the general purpose tape recorders. For this reason, both of the above two types of transcribers, one recordable and the other immediately erasable after being typed, have been used up until non depending on the purpose, to cover the weak points of each type.

SUMMARY OF THE INVENTION

One object of the present invention is to eliminate the above described defect of the transcriber.

Another object of the present invention is to make provisions in such a transcriber to raise typing efficiency by enabling easy and instantaneous erasing of recorded information on a tape.

The other object of the present invention is to provide an economical transcriber where the two types of transcribers described above and used so far can be covered by only one type.

According to the present invention, this transcriber is comprised of a through-hole provided in a part of the main body of a transcriber, and an eraser which has a magnet to generate magnetic flux in a prescribed direction to the through-hole. The eraser, consisting of the through-hole and the magnet, is provided at the protruding part of the main body of a transcriber. This through-hole is made big enough for a cassette tape to pass through and the magnet can be either a permanent type or an electromagnet type.

DESCRIPTION OF THE PREFERRED EMBODIMENT

Figure 1:
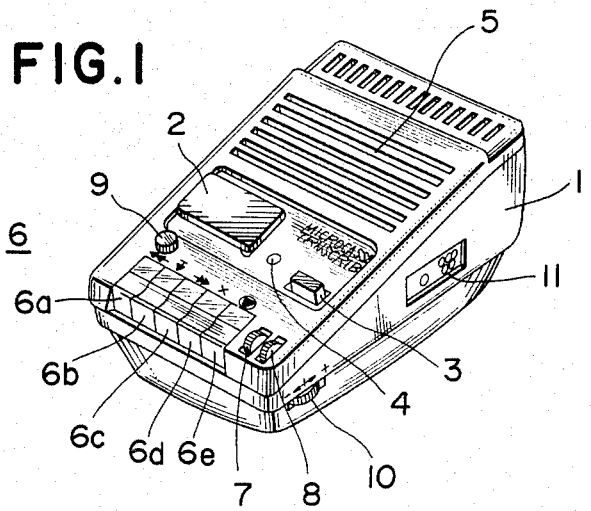
FIG. 1 is an oblique view drawing which denotes an example of a prior transcriber.

Referring to the drawings, an example of a recordable transcriber to which the present invention is applied, is described below.

Figure 2:
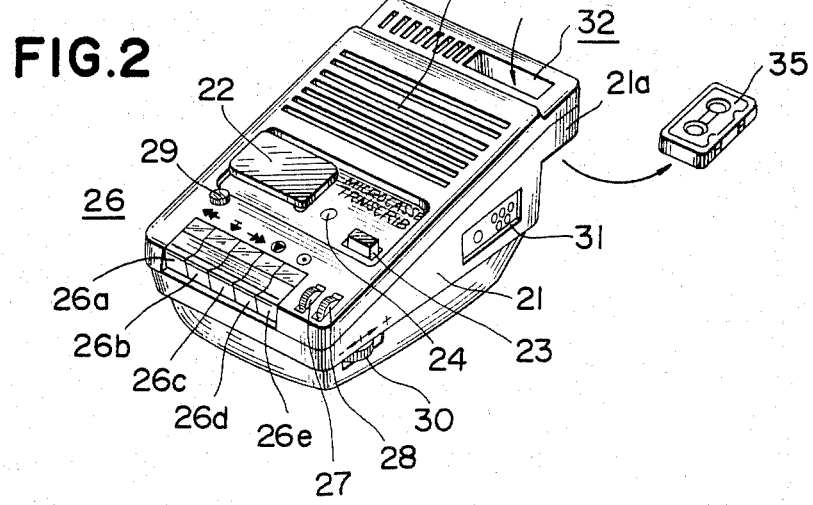
FIG. 2 is an oblique view drawing which denotes the appearance of an example of the transcriber by the present invention.
Figure 3:
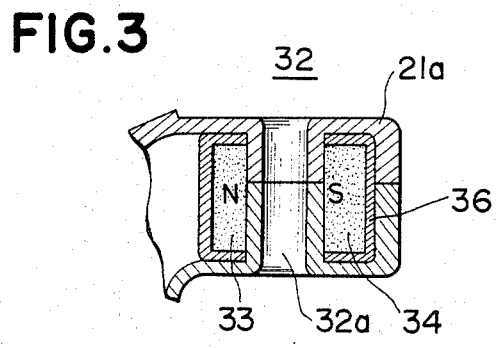
FIG. 3 is a cross-section drawing of the eraser part of the same example.

In the FIG. 2, "21" is the main body of a transcriber, and the cassette chamber "22" is provided almost at the center front of this main body "21". The power switch "23" and the pilot lamp "24" which is lighted by throwing-in the power switch "23" are provided next to the cassette chamber "22". Above the cassette chamber "22", the plug-in-hole "25" for a speaker is provided and beneath the chamber "22", various operating buttons "26" provided. These buttons "26" include a fast forwarding button "26a", a reproducing button "26b", a rewinding button "26c", a stop button "26d" and a recording button "26e". Next to those buttons "26", the dials for tone "27" and for volume "28" are provided and between those dials and the cassette chamber "22", the ejector button "29" is provided.

Also to the side of the main body "21", the dial "30" to adjust tape speed and the jack "31" for remote controlling are attached. By connecting a foot operating switch which is not shown in the figure, to this jack "31", the reproducing operation can be also controlled by foot.

On the other hand, at one end of the aformentioned main body "21", an protruding part "21a" is formed, and the eraser "32" is provided at this protruding part "21a". This eraser "32" is so arranged that the through-hole "32a" passes through the protruding part "21a", and permanent magnets "33" and "34" are arranged around the through-hole "32a" with the polarity shown in the figure so as to generate magnetic flux to the through-hole "32a" in a prescribed direction. In this case, the through-hole "32a" is made big enough for a cassette tape to pass through. To prevent the other parts from being affected by the magnetic flux generated by the permanent magnets "33" and "34", the permanent magnets "33" and "34" are surrounded by magnetic materials such as permalloy.

By the configuration described above, this transcriber can be operated by various operating buttons "26a'-'-"26d" for recording, reproducing and the like, after mounting a tape in the cassette chamber "21". When it is necessary to erase the information recorded on the tape after reproduction of the recorded information is finished, the information on the tape "35" can be easily and instantaneously erased by passing the tape "35" through the through-hole "32a" of the eraser "32" to the direction as indicated by the arrow in the figure.

Particularly in the case of this illustration, there is the feature of easy handling of the tape "35" when erasing, because the eraser "32" is provided at the protruding part "21a" of the main body "21" of the transcriber.

Thus, the information recorded on a tape can be erased easily and instantaneously by the configuration described above, so that it can largely contribute to increasing the efficiency of works such as typing by greatly simplifying the steps to erase tape contents, as compared with the prior transcribers which must erase tape contents in conjunction with rewinding and erasing functions, or which must use a half width erasing function which is accompanied by a new recording. Also it has the economical advantage of making unnecessary the use of two types of transcribers, one recordable and the other for typists, depending on the purpose.

Now the present invention is not limited only to the example described above, but can also be applied in various ways as the occasion may demand so longas the essential points remain unchanged. For example, the aforementioned example is described as it applies to the recordable transcriber, but the present invention can naturally be applied equally to the reproduction purpose type. Also the permanent magnet is used in the eraser in the aforementioned example, but the present invention can also utilize an electromagnet type instead of the above one.

What is claimed is:

1. In a transcriber having a main body and means for transcribing information recorded on a cassette tape, the improvement comprising a through-hole provided in a part of the main body of the transcriber and an erasing device for magnetic tape stored in a cassette which has a magnet to generate magnetic flux in a prescribed direction to the through-hole, said through-hole being made sufficiently large to permit a tape cassette to pass there-through, and wherein said magnet is surrounded by magnetic material for shielding purposes.

2. A transcriber as claimed in claim 1, wherein the said through-hole and magnet are provided at a protruding part of the main body of transcriber.

3. A transcriber as claimed in claim 1, wherein said magnet is a permanent magnet type.

4. A transcriber as claimed in claim 1, wherein said magnet is an electromagnetic type.

5. In a transcriber having a main body and means for transcribing information recorded on a magnetic tape stored in a tape cassette, the improvement comprising:
   said main body having a protruding portion located remotely from the transcribing means;
   said protruding portion having a through-hole of a sufficient size so as to permit a tape cassette to pass therethrough; and
   an erasing device for magnetic tape stored in a cassette embedded in said protruding portion adjacent said through-hole, said erasing device including a magnet for generating magnetic flux in a prescribed direction to said through-hole, said magnet being surrounded by magnetic material for shielding purposes.

6. A transcriber in accordance with claim 5, wherein said main body includes a base portion and, when said base portion rests on a flat surface, said protruding portion being a predetermined height above said flat surface to allow a tape cassette to be passed through said through-hole and removed without having to move the transcriber.

* * * * *